United States Patent [19]

Tanton et al.

[11] Patent Number: 4,475,197

[45] Date of Patent: Oct. 2, 1984

[54] SUBMILLIMETER WAVE FREQUENCY SHIFTER

[75] Inventors: George A. Tanton; Harry C. Meyer, both of Huntsville, Ala.; James F. Osmunds, Champaigne, Ill.

[73] Assignee: The United States of America as represented by the Secretary of the Army, Washington, D.C.

[21] Appl. No.: 412,652

[22] Filed: Aug. 30, 1982

[51] Int. Cl.³ .............................................. H01S 3/091
[52] U.S. Cl. ........................................ 372/4; 307/425; 372/20; 372/37; 372/55; 372/71
[58] Field of Search ...................... 307/425; 372/4, 37, 372/28, 71, 20, 55

[56] References Cited

U.S. PATENT DOCUMENTS 4,027,948   6/1977   Tanton et al. .................. 350/151
4,033,670   7/1977   Tanton et al. .................. 350/151

OTHER PUBLICATIONS

Yariv, "Electro-Optic Frequency Modulation in Optical Resonators" Proceedings of the IEEE, vol. 52, No. 6, pp. 719-720, Jun. 1964.

Tanton et al., "Atmospheric Propogation of Submillimeter Waves: Observed . . . Wavelength"; published in Proceedings of the Workshop on Millimeter and Submillimeter Atmospheric Propogation Applicable to Radar and Missile Systems; Technical Report RR-8-0-3, pp. 90-94, Redstone Arsenal, AL Feb. 1980.

Primary Examiner—James W. Davie
Attorney, Agent, or Firm—Anthony T. Lane; Robert P. Gibson; Freddie M. Bush

[57] ABSTRACT

Laser radiation whose wavelength is in the submillimeter wave spectral region is sent through an intercavity dielectric tube positioned inside a coil. The tube contains a gas having large dipole moments and which may be of the same kind as the input beams lasing gas. In response to current therethrough the coil produces an axial magnetic field. The direction of the magnetic field is parallel to the propagation of light transmitted through the dielectric tube. The frequency of the submillimeter wave laser radiation in the tube is shifted from its normal value. The amount of shift is determined by the current in the coil since the resulting magnetic field produces a change in the mean index of refraction of the gas. Thus, the change in index of refraction causes a shift in the laser radiation frequency because the gas within the coil is also located within the submillimeter wave lasing cavity.

8 Claims, 1 Drawing Figure

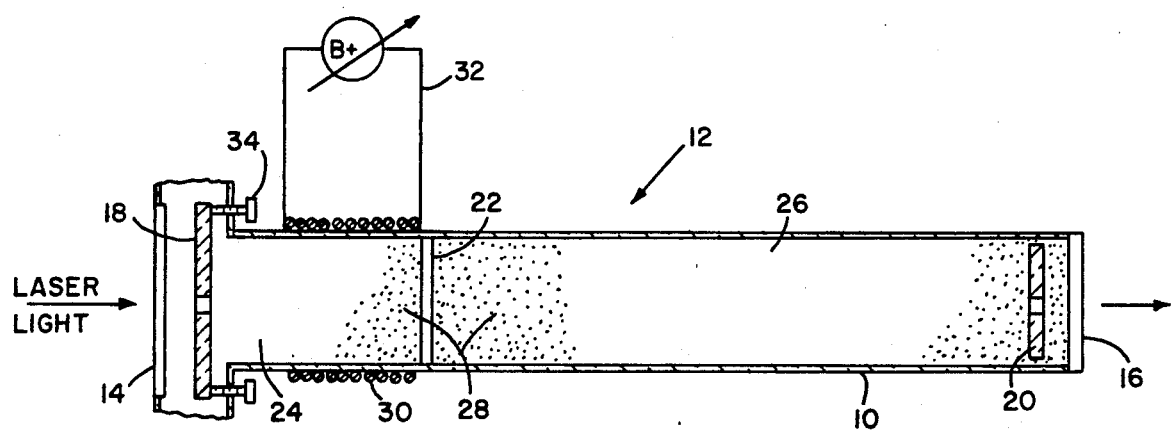

SUBMILLIMETER WAVE FREQUENCY SHIFTER

DEDICATORY CLAUSE

The invention described herein may be manufactured, used, and licensed by or for the Government for governmental purposes without the payment to us of any royalties thereon.

BACKGROUND OF THE INVENTION

The submillimeter frequency shifter is not restricted by the usual limitations of small aperture, low efficiency, and restricted frequencies of operation common to laser frequency shifters currently under development or in use for such applications as frequency chirping for laser radar, laser isotope enrichment, fluorescence spectroscopy, and optical pulse compressors. Due to small linear and angular apertures and very high absorption at the longer wavelengths, prior art frequency shifters are unsuitable for operation in the submillimeter wave region of the spectrum near 1 mm. These prior art frequency shifters depend upon the bulk properties of solid materials whereas the present frequency shifter utilizes optical properties of narrow absorption lines in gases that are due to the molecular structures of the gases.

SUMMARY OF THE INVENTION

The present invention has provided a solution to overcome the above stated limitations by developing a frequency shifter feature for a submillimeter gas laser. The submillimeter laser frequency shifter comprises an intercavity tube having input and output ends, a window sealing each end of the tube, a mirror adjacent to the input window inside the tube, and a lasing gas filling the tube chamber. A laser beam of submillimeter frequency is frequency shifted and propagates from the output window after the input beam enters the chamber via the input window. A dividing window is disposed between the mirrors inside the intercavity tube chamber for dividing the chamber into a first gas chamber and a second gas chamber. The gas pressure in the first chamber is maintained at a higher gas pressure than the lasing gas in the second chamber. Magnetic field-inducing means is disposed adjacent to and encompassing the first chamber for selectively inducing a magnetic field within the first chamber causing the submillimeter laser frequency therein to shift.

BRIEF DESCRIPTION OF THE DRAWING

The single FIGURE is a diagrammatic showing of the preferred embodiment of the present invention.

DESCRIPTION OF THE PREFERRED EMBODIMENT

As shown in the drawing, light from an infrared optical source, (not shown) such as a $CO_2$ laser generator, is directed into a submillimeter gas laser having a housing 10 with an intercavity tube chamber 12 within the housing. A sodium chloride (NaCl) or a silicon window 14 seals the input end of chamber 12 and a silicon or fused quartz window 16 seals the output end. An input coupling mirror 18 has a small diameter hole therein for passing infrared radiation into the chamber. Adjacent output window 16 is an output coupling mirror 20 of prior art having a small diameter hole in the reflective coating thereon for passing the frequency shifted radiation out of the laser chamber. Mirrors 18 and 20 comprise the submillimeter wave cavity within the tube. A window such as a silicon window 22 is disposed between mirrors 18 and 20 within chamber 12 and effectively separates the chamber into two separately sealed gas cavities 24 and 26. Both gas cavities or chambers are filled with a laser gas 28 for providing frequency shifted laser radiation therein.

The lasing gas 28 is any lasing gas usable in submillimeter gas lasers of the type indicated and may typically be $CH_3F$, fluoromethane; $CH_3Cl$, chloromethane; $CH_3Br$, bromomethane; and $C_2H_2F_2$, difluoroethylene. The gas pressure within the first chamber 24 is higher than the pressure within the second chamber. Nominal pressures within the chambers may be 100 millitorr and 50 millitorr respectively but are not restricted to this proportion.

A solenoid coil 30 is circumferentially wound around the first chamber 24 and produces an axial magnetic field therein upon excitation of the coil by a variable direct current power source B+ through conductors 32. Varying the magnetic field changes the mean index of refraction of the lasing gas within the first chamber 24 which in turn results in a shifting of the input submillimeter frequency radiation.

Cavity adjusting means 34 adjusts disposition of the mirror 18 for tuning the cavity. Means (not shown) for supplying and adjusting gas pressure in the chamber, and other chamber parameters may be varied as is well known for further tuning for optimizing performance.

In operation, a laser beam from a $CO_2$ laser generator or other similar optical source is propagated successively through input window 14 and input mirror 18, into the first lasing chamber 24, through the dividing window 22 into the second lasing chamber 26, and onto output mirror 20 at the output end of the intercavity chamber 26. Subsequent lasing action produces a submillimeter laser beam which passes through the hole in output mirror 20, and exits the laser via the output window 16. For frequency shifting the output radiation, current supplied through conductors 32 excite solenoid 30 thereby inducing an axial magnetic field within the lasing chamber 24. The magnetic field in turn causes a change in the optical properties of the lasing gas 28 in chamber 24 and consequently a shift in the frequency of the beam as it passes from the first lasing chamber 24 through the dividing window 22, and out of the output window. By applying a fixed direct current voltage B+ to coils 30 a fixed shift in the output frequency occurs. By varying the voltage the frequency shift is varied allowing modulation to occur.

Thus the input optical radiation interacts with frequency shifter gas in chamber 24 which is at a higher pressure than the submillimeter wave lasing gas in chamber 26 and is adjusted for optimum performance. This difference in pressure affects the depletion rate of the ground submillimeter wave lasing level in the gas in chamber 24 causing it to have a net absorption to the submillimeter wave radiation stimulated in the same kind of gas by the $CO_2$ radiation that passes through Si window 22 into chamber 26. The submillimeter wave thus generated by the interaction of the $CO_2$ radiation with the gas at a nominal pressure of 50 millitorr in chamber 26 passes back through window 22 and is absorbed by the gas in chamber 24 by an amount depending on the strength of the axial magnetic field produced by current flowing from source B+ through coil 30 and which is adjusted or varied to produce the desired frequency shift. The change in magnetic field changes the mean index of refraction and hence the optical path. This is what tunes the frequency. The frequency shifted radiation then passes back through window 22 to the output coupler 20. The frequency shifted wave continues through the output fused quartz window 16 to provide the frequency shifted output.

Obviously, various other modifications and variations of the present invention are possible in light of the above disclosure. For example, the optimum combination of magnetic field strength, lasing gas, and chamber characteristics may be obtained by adjusting current levels through conductors, or tuning the adjusters. Therefore, it should be understood that the invention is limited only by the claims appended hereto.

We claim:

1. A submillimeter wave frquency shifter comprising: a plural chamber housing, said housing having an optically transparent chamber extending through the housing and having an input end and an output end; first and second windows sealing respective chamber ends; first and second mirrors adjacent said first and second windows inside the chamber; a substantially transparent window disposed between the mirrors within said optically transparent chamber for separating the chamber into first and second gas chambers, said first gas chamber being adjacent the input end of said housing; a lasing gas within said chambers for propagating an output submillimeter laser beam therethrough to the output window when a beam from an input source impinges the input window; and magnetic field inducing means disposed adjacent the first gas chamber for selectively inducing an axial magnetic field within the gas in said first gas chamber and thereby causing the output submillimeter laser frequency to shift in response to the magnetic field.

2. A submillimeter wave frequency shifter as set forth in claim 1 wherein the magnetic field inducing means comprises a solenoid coil circumferentially wound around the first gas chamber, direct current voltage supply means, and conductors connected between the coil and the voltage supply means whereby a magnetic field is induced within the chamber when the coil is energized.

3. A submillimeter wave frequency shifter as set forth in claim 2 wherein the lasing gas pressure in the first gas chamber is greater than the lasing gas pressure in the second gas chamber.

4. A submillimeter wave frequency shifter as set forth in claim 3 and further comprising adjusting means disposed adjacent said housing optically transparent chamber for varying the disposition of the mirrors within the chamber.

5. A submillimeter wave frequency shifter as set forth in claim 4 wherein the transparent window is silicon.

6. A submillimeter wave frequency shifter as set forth in claim 5 wherein said gas has an absorption line with components therein capable of being shifted to either side of an input submillimeter laser frequency by a magnetic field.

7. A submillimeter wave frequency shifter as set forth in claim 6 wherein the lasing gas is selected from the group consisting of $CH_3F$, $CH_3Cl$, $CH_3Br$, and $C_2H_2F_2$.

8. A submillimeter wave frequency shifter as set forth in claim 7 wherein said housing is a dielectric tube.

* * * * *

UNITED STATES PATENT AND TRADEMARK OFFICE
CERTIFICATE OF CORRECTION

PATENT NO. : 4,475,197
DATED : October 2, 1984
INVENTOR(S) : George A. Tanton, Harry C. Meyer, and James F. Osmunds It is certified that error appears in the above—identified patent and that said Letters Patent is hereby corrected as shown below:

First page of the Patent, INID Code [75], third line, "Osmunds" should read - - Osmundsen - -.

Signed and Sealed this

Fourth Day of June 1985

[SEAL]

Attest:

DONALD J. QUIGG

Attesting Officer   Acting Commissioner of Patents and Trademarks